Jan. 1, 1963 J. K. LIVINGSTONE 3,071,696

PARAMETRICALLY EXCITED RESONATOR LOGIC SYSTEM

Filed Dec. 2, 1959 2 Sheets-Sheet 1

INVENTOR.
JAMES K. LIVINGSTONE

BY F. W. Henson

ATTORNEY

United States Patent Office 3,071,696

Patented Jan. 1, 1963

3,071,696

PARAMETRICALLY EXCITED RESONATOR LOGIC SYSTEM

James K. Livingstone, Michigan City, Ind., assignor to General Dynamics Corporation, Rochester, N.Y., a corporation of Delaware Filed Dec. 2, 1959, Ser. No. 856,771

2 Claims. (Cl. 307—88)

Figure 1:
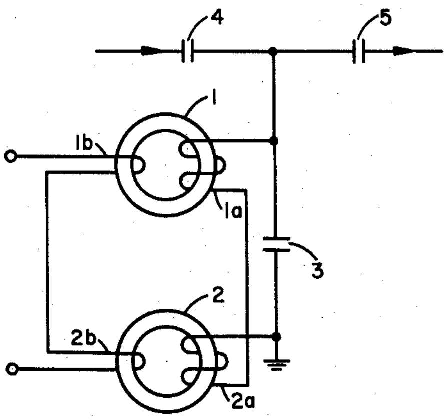
PRIOR ART Fig. 1

This invention relates in general to logic systems and, more particularly, to logic systems utilizing parametrically excited resonators as the principal elements thereof.

Logic systems utilizing parametrically excited resonators, or parametrons, as the principal elements thereof have been described by Eiichi Goto in a paper entitled "The Parametron, A Digital Computing Element Which Utilizes Parametric Oscillation" and published in the August 1959 issue of Proceedings of the IRE. As described in the above-identified paper, a parametron element is essentially a resonant circuit with the reactance of a reactive element varying periodically at frequency $2f$ to generate a parametric oscillation at sub-harmonic frequency $f$. The sub-harmonic parametric oscillation thus generated is stable in either of two phases which differ by $\pi$ radians with respect to each other. Thus, a parametron is capable of storing a binary "0" or "1" as determined by the phase of an input signal. Prior to this invention, the parametrons of a logic system were divided into three groups and the sense of direction and delay necessary for transferring information from parametron to parametron was accomplished by periodically applying and removing the excitation frequency $2f$ to and from the groups of parametrons. This method of information transfer requires high quality gating circuitry which does not introduce phase shift in the excitation signal and imposes variable loading upon the source of excitation, necessitating an extremely low source impedance.

Accordingly, it is the general object of this invention to provide a new and improved logic system utilizing parametrically excited resonators as the principal elements thereof.

It is a more particular object of this invention to provide a new and improved parametrically excited resonator logic system in which information is transferred from stage to stage under control of simple gating devices. Briefly, the present invention accomplishes the above cited objects by the expedient of continuously applying the exciting signal $2f$ to the saturable reactors which form the parametrically excited resonators and switching D.C. pulses to the groups of resonators to effect the transfer of information. When a D.C. pulse is not applied to the saturable reactors, the exciting current controls the reactors on the linear portion of their B—H characteristics so that periodically varying inductance and the resulting parametric oscillation do not occur. When a D.C. pulse is applied to the saturable reactors, the saturable reactors are thereby biased to the knee of their respective B—H characteristics and the exciting signal $2f$ therefore controls large changes in the inductance of the saturable reactors. Thus, constant loading is presented to the source of exciting current and simple gating devices are used to control the application of the D.C. pulses to the groups of resonators.

Further objects and advantages of the invention will become apparent as the following description proceeds, and features of novelty which characterize the invention will be pointed out in the claims annexed to and forming a part of this specification.

For a better understanding of the invention, reference may be had to the accompanying drawings which comprise seven figures on two sheets.

Figure 2:
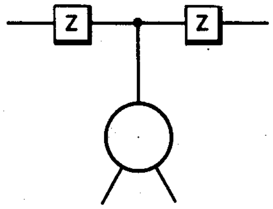
PRIOR ART Fig. 2
Figure 3:
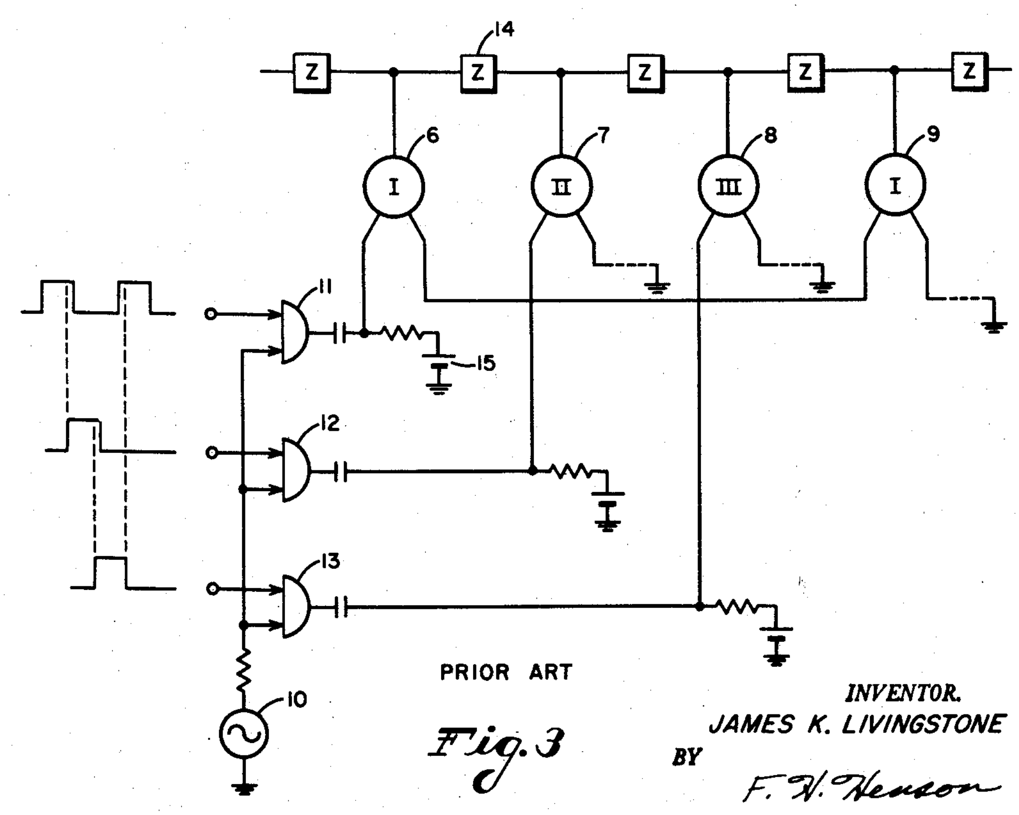
PRIOR ART Fig. 3
Figure 4:
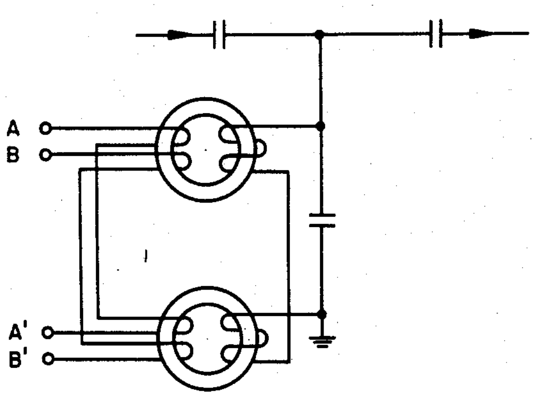
Figure 5:
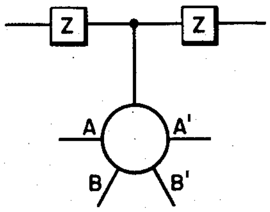
Figure 6:
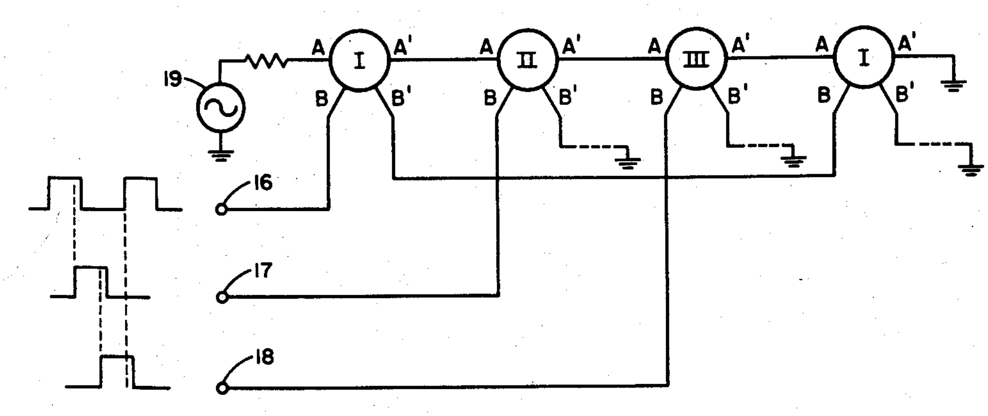
Figure 7:
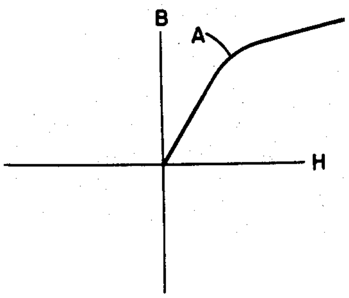

FIG. 1 shows a parametron, or parametrically excited resonator, of the prior art, FIG. 2 is a logic symbol which represents the circuit of FIG. 1, FIG. 3 shows a logic system typical of the prior art and in which information transfer from stage to stage is accomplished by the periodic application of exciting current to the groups of stages, FIG. 4 shows a parametrically excited resonator designed in accordance with the present invention, FIG. 5 is a logic symbol representing the circuit of FIG. 4, FIG. 6 shows a logic system designed in accordance with the present invention, and FIG. 7 is a graphic illustration of the B—H characteristic of core material suitable for use in the saturable reactors shown in FIGS. 1–6.

Before proceeding to describe a logic system constructed in accordance with the present invention, it is believed expedient to a more complete understanding of the invention to first describe logic systems of the prior art, as shown in FIGS. 1–3. A typical parametron of the prior art, as shown in FIG. 1, comprises saturable reactors 1 and 2 and capacitor 3. The equal valued primary windings 1*a* and 2*a* on cores 1 and 2, respectively, are connected in series opposition and in circuit with capacitor 3 to form a resonant circuit having a resonant frequency $f$. In the absence of the application of an exciting signal having a frequency which is a harmonic of frequency $f$, and which is usually $2f$, to windings 1*b* and 2*b* on cores 1 and 2, an input signal of frequency $f$ applied through coupling impedance capacitor 4 to the resonant circuit produces small oscillations in the resonant circuit. However, when an exciting signal and D.C. potential, sufficient to bias cores 1 and 2 to the knee of their respective B—H characteristics, are applied to windings 1*b* and 2*b*, an amplified output signal in phase with the input signal coupled through capacitor 4 is produced by the resonant circuit and coupled through capacitor 5 to the next succeeding stage, as fully explained in the above-identified paper. As shown in FIG. 2, the circuit of FIG. 1 is represented by a logic symbol comprising a circle, a pair of coupling impedances, marked Z and corresponding to capacitors 4 and 5, and leads designating the excitation windings.

As previously mentioned, in systems of the prior art the parametrons are divided into three groups for information transfer purposes. As shown in FIG. 3, the group to which a particular parametron is assigned is indicated by the number within the circle. For example, as illustrated, parametrons 6 and 9 are in group 1 while parametrons 7 and 8 are in groups 2 and 3, respectively. To illustrate the operation of the information transfer system, asume that information has just been transferred into group 1 parametrons 6 and 9 from a group 3 parametron (not shown) and group 3 parametron 8, respectively. Under these conditions, the positive-going gating pulse is applied to the upper terminal of AND gate 11 and the exciting signal having a frequency of $2f$ from generator 10 is therefore coupled through gate 11 to excite all of the group 1 parametrons. The amplified output signal from parametron 6 is coupled through impedance 14 to the resonant circuit in group 2 parametron 7 but has no effect at this time since exciting signal $2f$ is blocked by gate 12. Just prior to the closing of gate 11, a positive-going pulse is applied to the upper terminal of gate 12 so that exciting current is applied to the group 2 parametrons through gate 12 before oscillation of the group 1 parametrons is terminated. Similarly, information is transferred from the group 2 to the group 3 parametrons when gate 13 is opened just prior to the closing of gate 12. As illustrated by battery 15 in FIG. 3, D.C. bias is continuously applied to the exciting windings of the saturable reactors forming the parametrons to bias said saturable reactors to the knee of their respective B—H characteristics, as indicated by point A on the curve of FIG. 7.

As shown in FIGS. 4 and 5, the individual parametron and the logic symbol representing same as used in the system constructed in accordance with the present invention differ from the prior art only in that a third winding is provided on each saturable reactor forming the parametron. As shown in FIG. 6, excitation signal source 19 is connected to continuously apply excitation current to the windings connected between terminals A and A′ in each parametron since all of said windings are connected in series with said source. The excitation signal is ineffective to produce inductance changes in the various cores when D.-C. bias is not applied to said cores since each core is working on the linear portion of its B—H characteristic, shown in FIG. 7. Transfer of information from parametron to parametron is controlled by the application of first, second, and third time interlaced pulse trains, which may be generated by any suitable well known device, to terminals 16, 17, and 18, respectively. As shown in FIG. 6, the leading edge of each pulse of the first train applied to terminal 16 slightly overlaps the trailing edge of the next preceding pulse of the third train applied to terminal 18, the leading edge of each pulse of the second train applied to terminal 17 slightly overlaps the trailing edge of the next preceding pulse of the first train, and the leading edge of each pulse of the third train slightly overlaps the trailing edge of the next preceding pulse of the second train. The magnitude of each pulse and the number of turns on each winding connected between terminals B and B′ in each parametron are so related that each saturable reactor is biased to the knee of its B—H characteristic when a pulse is applied to its winding. Therefore, an amplified output signal in phase with the input signal coupled to the resonant circuit of each parametron is developed only when a D.-C. pulse is applied to the bias windings of the cores in that parametron.

While there has been shown and described what is at present considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In combination, first, second, and third parametrically excited resonators, each of said resonators comprising first and second saturable reactors each having first, second, and third windings, and a capacitor, means for connecting the first windings in each resonator in series opposition and in circuit with the capacitor in that resonator to form a resonant circuit having a resonant frequency $f$, first impedance means for interconnecting the resonant circuits in said first and second resonators, second impedance means for interconnecting the resonant circuits in said second and third resonators, means for continuously applying an exciting signal having a frequency which is a harmonic of frequency $f$ to all the second windings on each of said saturable reactors in each resonator in series, means for applying an input signal of frequency $f$ to the resonant circuit in said first resonator, means including said third windings on the saturable reactors of said first resonator for thereafter biasing each of said first and second saturable reactors in said first resonator to the knee of its B—H characteristic to thereby control the resonant circuit in said first resonator to produce an amplified output signal in phase with said input signal, means including said third windings on the saturable reactors of said second resonator for thereafter biasing each of said first and second saturable reactors in said second resonator to the knee of its B—H characteristic to thereby control the resonant circuit in said second resonator to produce an amplified output signal in phase with the signal coupled through said first impedance means, means for thereafter removing the bias from said first and second saturable reactors in said first resonator, means including said third windings on the saturable reactors of said third resonator for thereafter biasing each of said first and second saturable reactors in said third resonator to the knee of its B—H characteristic to thereby control the resonant circuit in said third resonator to produce an amplified output signal in phase with the signal coupled through said second impedance means, and means for thereafter removing the bias from said first and second saturable reactors in said second resonator.

2. In combination, first, second, and third parametrically excited resonators, each of said resonators comprising first and second saturable reactors each having first, second, and third windings, and a capacitor, means for connecting the first windings in each resonator in series opposition and in circuit with the capacitor in that resonator to form a resonant circuit having a resonant frequency $f$, first impedance means for interconnecting the resonant circuits in said first and second resonators, second impedance means for interconnecting the resonant circuits in said second and third resonators, means for continuously applying an exciting signal having a frequency which is a harmonic of frequency $f$ to the second winding on each saturable reactor in each resonator in series, means for applying an input signal of frequency $f$ to the resonant circuit in said first resonator, means for developing first, second, and third trains of time interlaced pulses in which the leading edge of each pulse of said second train slightly overlaps the trailing edge of the next preceding pulse of said first train, the leading edge of each pulse of said third train slightly overlaps the trailing edge of the next preceding pulse of said second train, and the leading edge of each pulse of said first train slightly overlaps the trailing edge of the next preceding pulse of said third train, and means for applying the pulses of said first, second, and third trains to the third windings in said first, second, and third resonators, respectively, the magnitude of each pulse and the number of turns on each third winding being so related that each saturable reactor is biased to the knee of its B—H characteristic when a pulse is applied to its third winding.

References Cited in the file of this patent

UNITED STATES PATENTS

| | | |
|---|---|---|
| 2,928,008 | Takahasi et al. | Mar. 8, 1960 |
| 2,946,045 | Goto | July 19, 1960 |
| 2,957,087 | Goto | Oct. 18, 1960 |

OTHER REFERENCES

"The Parametron, A Digital Computing Element Which Utilizes Parametric Oscillation," Proceedings of the IRE, August 1959, pp. 1304–1316.